(12) United States Patent
Stolz

(10) Patent No.: US 10,890,232 B2
(45) Date of Patent: Jan. 12, 2021

(54) SOCKET ASSEMBLY

(71) Applicant: Caterpillar Inc., Peoria, IL (US)

(72) Inventor: Michael R. Stolz, Franklin, WI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/689,082

(22) Filed: Aug. 29, 2017

(65) Prior Publication Data
US 2019/0063551 A1  Feb. 28, 2019

(51) Int. Cl.
*F16G 11/04* (2006.01)
*B66C 1/12* (2006.01)
*B66C 1/16* (2006.01)

(52) U.S. Cl.
CPC .............. *F16G 11/046* (2013.01); *B66C 1/12* (2013.01); *B66C 1/16* (2013.01); *F16G 11/04* (2013.01); *F16G 11/048* (2013.01)

(58) Field of Classification Search
CPC ................................ F16G 11/046; B66C 1/12
See application file for complete search history.

(56) References Cited

U.S. PATENT DOCUMENTS

| | | | | |
|---|---|---|---|---|
| 1,248,991 A * | 12/1917 | Barger | ..................... | F16G 11/00 403/213 |
| 1,297,187 A * | 3/1919 | Lamb | ..................... | F16G 11/04 403/211 |
| 2,464,893 A * | 3/1949 | Ross | ..................... | H01R 13/639 439/369 |
| 2,518,700 A * | 8/1950 | Lucas | ..................... | B66B 7/08 403/68 |
| 3,475,795 A * | 11/1969 | Youngblood | ........... | F16G 11/05 24/122.6 |
| 3,994,495 A * | 11/1976 | Stoffel | ................... | A63B 49/00 473/521 |
| 4,066,368 A * | 1/1978 | Mastalski | ............... | F16G 11/04 24/115 M |
| 4,309,033 A * | 1/1982 | Parker, Jr. | ............ | A63B 49/025 473/540 |
| 4,333,675 A * | 6/1982 | Wirkkala | .................. | B66C 1/12 24/122.6 |
| 4,395,798 A * | 8/1983 | McVey | .................. | D07B 1/185 24/122.6 |
| 4,438,995 A * | 3/1984 | Fisher | ................... | F16L 19/005 174/87 |
| 4,459,722 A * | 7/1984 | Dziedzic | ................. | F16G 11/02 24/115 N |
| 4,561,154 A | 12/1985 | Briscoe et al. | | |
| 4,602,891 A | 7/1986 | McBride | | |

(Continued)

FOREIGN PATENT DOCUMENTS

CA  2169516  5/1997

*Primary Examiner* — Robert Sandy
*Assistant Examiner* — David M Upchurch
(74) *Attorney, Agent, or Firm* — Oblon, McClelland, Maier & Neustadt

(57) ABSTRACT

A socket assembly includes a socket. The socket defines a first interior space. The socket includes a first frame and a second frame disposed opposite to the first frame. The first frame is coupled with the second frame using at least one fastening member. The socket assembly includes a locking member disposed within the first interior space of the socket. The locking member includes a first portion and a second portion. The first and second portions define a second interior space for holding a rope.

10 Claims, 8 Drawing Sheets

(56) References Cited

U.S. PATENT DOCUMENTS

| | | | |
|---|---|---|---|
| 5,243,739 A | 9/1993 | Schmidt | |
| 5,988,929 A | 11/1999 | Doan | |
| 8,245,360 B2 * | 8/2012 | Stafford | F16G 11/048 24/115 M |
| 8,249,412 B2 * | 8/2012 | Quesnel | F16G 11/06 104/220 |
| 9,382,757 B1 * | 7/2016 | Kirk | E06B 9/38 |
| 2007/0006429 A1 * | 1/2007 | Huffman | F16G 11/048 24/136 R |
| 2007/0119562 A1 * | 5/2007 | Gregory | F16G 11/042 164/54 |
| 2012/0141198 A1 * | 6/2012 | Kondo | F16G 11/02 403/361 |
| 2015/0303592 A1 * | 10/2015 | Tait | H01R 4/26 439/391 |

* cited by examiner

SOCKET ASSEMBLY

TECHNICAL FIELD

The present disclosure relates to a socket assembly, and more particularly to the socket assembly for mounting a suspended load.

BACKGROUND

Socket assemblies are used in various suspended load mounting applications including, but not limited to, a bucket of a machine such as dragline, suspended bridges, and construction equipment. Typically, the socket assembly is used to attach and retain a rope associated with a suspended load. The socket assembly includes a locking member that is positioned within a socket. Generally, the locking member uses a force of the suspended load, power of the machine, and friction between the locking member and the socket for retaining the rope within the locking member. Further, when the rope needs to be replaced, the locking member needs to be removed from the socket, which is difficult due to increased friction between the locking member and the socket. Currently, a large hammer, or even a hydraulic hammer, is used to pound out the locking member for removing the rope from the locking member, which is not desirable.

U.S. Pat. No. 5,243,739 describes a self-locking cable end termination socket assembly. The self-locking cable end termination socket assembly has a one-piece tapered wedge as a locking device for a cable that fits into a housing with two parts that are locked together. The wedge and a cable looped over the wedge fits within an interior opening in the housing. When the cable is tightened, the wedge tightens against surfaces defining the opening in the housing and wedges in place. The two housing parts include a saddle and a cap which fit together and are held in a fixed position with interlocking members. The cap has a knock-off lug that, when hit with sufficient force, such as by using a weight on an end of a cable to form a pendulum ram, will release from the saddle, making removal of the wedge and the cable.

SUMMARY OF THE DISCLOSURE

In one aspect of the present disclosure, a socket assembly is provided. The socket assembly includes a socket defining a first interior space. The socket includes a first frame and a second frame disposed opposite to the first frame. The first frame is coupled with the second frame using at least one fastening member. The socket assembly also includes a locking member disposed within the first interior space of the socket. The locking member includes a first portion and a second portion. The first and second portions define a second interior space for holding a rope.

In another aspect of the present disclosure, a suspended load mounting assembly is provided. The suspended load mounting assembly includes a rope for holding a suspended load. The suspended load mounting assembly also includes a coupling member coupled to the suspended load. The suspended load mounting assembly further includes a socket assembly for securing one end of the rope. The socket assembly is connected to the coupling member. The socket assembly includes a socket defining a first interior space. The socket includes a first frame and a second frame disposed opposite to the first frame. The first frame is coupled with the second frame using at least one fastening member. The socket assembly also includes a locking member disposed within the first interior space of the socket. The locking member includes a first portion and a second portion. The first and second portions define a second interior space for holding the rope.

In yet another aspect of the present disclosure, a method of servicing a socket assembly having a socket and a locking member is provided. The method includes separating a first frame and a second frame of the socket by removing at least one fastening member that couples the first and second frames. The method also includes disengaging a first portion and a second portion of the locking member. The method further includes replacing a rope disposed between the first and second portions of the locking member. The method includes engaging the first and second portions of the locking member upon disposing the rope. The method also includes coupling the first and second frames of the socket using the at least one fastening member.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
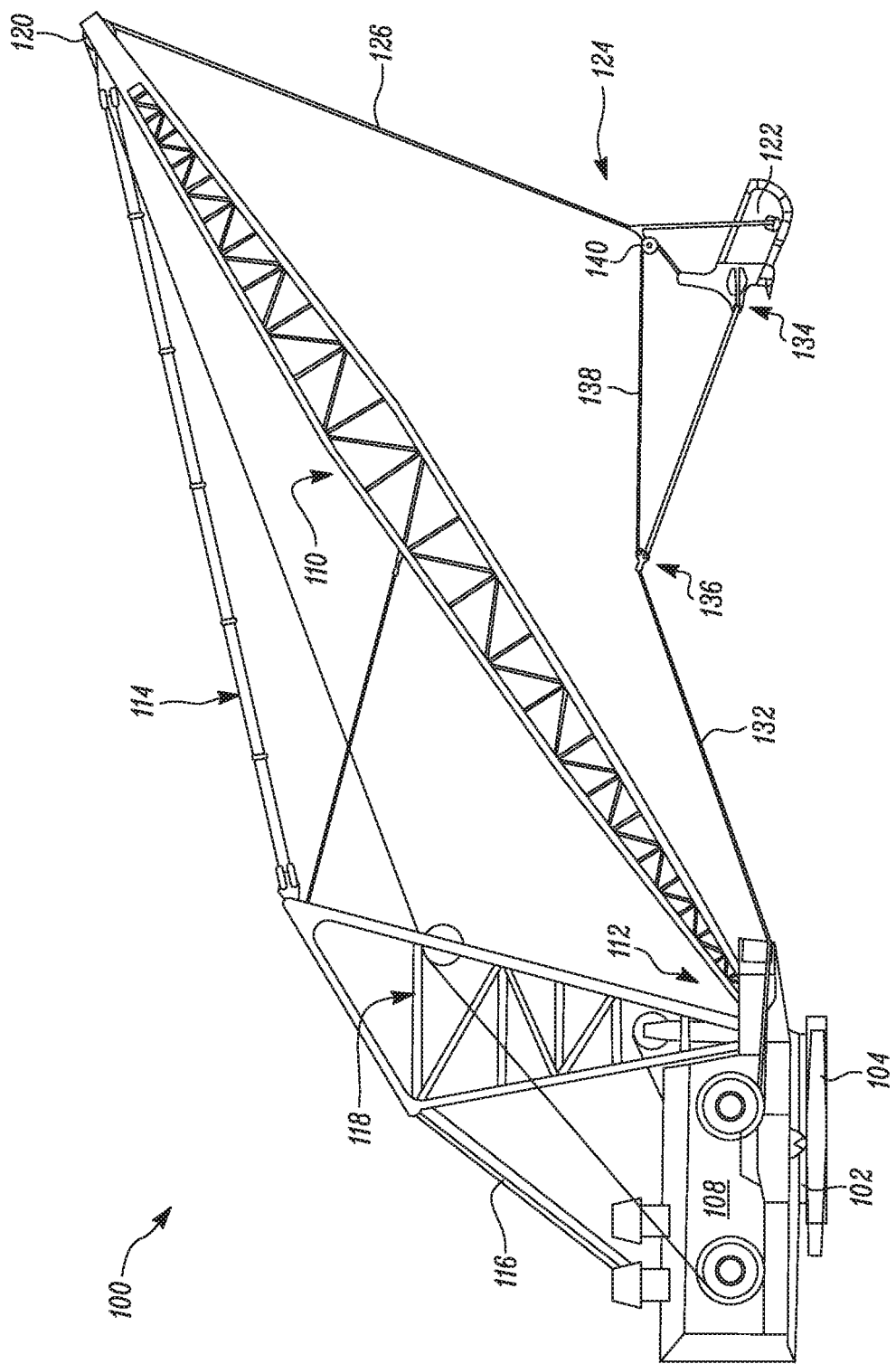
FIG. 1 is a side elevation view of an exemplary machine, according to one embodiment of the present disclosure

FIG. 1 is a side elevation view of an exemplary machine 100, according to one embodiment of present disclosure. In the illustrated embodiment, the machine 100 is embodied as a dragline excavator. Alternatively, the machine 100 may embody any other machine having a suspended bucket known in the art. Further, the machine 100 can operate at a worksite, such as a mine, a landfill, a quarry, a construction site, and the like. The machine 100 may perform operations associated with an industry such as mining, construction, farming, transportation, or any other industry known in the art.

The machine 100 includes a swing rack 102 supported on a base 104, a platform in the form of a machinery deck 108. A boom 110 is pivotally connected at a first end 112 of the machinery deck 108. The boom 110 is held in an upwardly and outwardly extending relation to the machinery deck 108 by a brace in the form of suspension cables 114, which are anchored to a back leg 116 of a tri-structure 118 rigidly mounted on the machinery deck 108. A sheave 120 is rotatably mounted on an upper end of the boom 110.

A bucket 122 is suspended from the boom 110 by a first suspended load mounting assembly 124, hereinafter interchangeably referred to as "the suspended load mounting assembly 124". The suspended load mounting assembly 124 includes a pair of ropes 126. One end of the rope 126 is wrapped over the sheave 120, and is adapted to be pulled out or pulled in over the sheave 120 for lowering or raising the bucket 122. The first suspended load mounting assembly 124 will be explained in detail later in this section. The machine 100 further includes a drag rope 132 connecting the machinery deck 108 and the bucket 122. For loading the bucket 122, the drag rope 132 is drawn towards the machinery deck 108. Further, the drag rope 132 is released for tilting the bucket 122 in order to unload the bucket 122.

Further, the machine 100 also includes a second suspended load mounting assembly 134 and a third suspended mounting assembly 136 connected to the bucket 122. The second and third suspended mounting assemblies 134, 136 are used for controlling a movement of the bucket 122 in respective loaded and unloading positions. The second and third suspended load mounting assemblies 134, 136 may be movably coupled to each other by a pair of ropes 138 wrapped over a pair of sheave 140. Each of the ropes 126, 138 may be embodied as a wire rope.

The suspended load mounting assembly 124 will now be explained in detail, and it should be noted that the description provided below is equally applicable to the second and third suspended load mounting assemblies 134, 136, without any limitations. Further, the suspended load mounting assembly 124 described herein may be implemented for various types of other suspended loads including, but not limited to, a suspension bridge, a rope shovel, and/or any other construction equipment.

Figure 2:
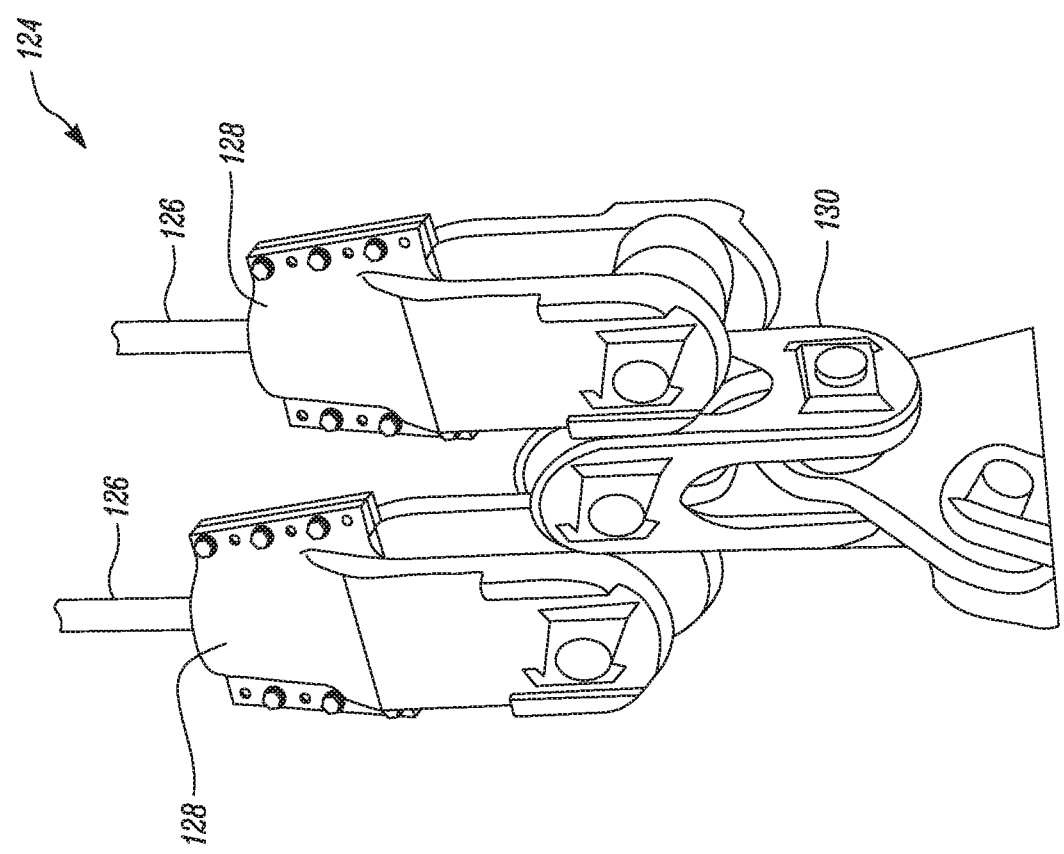
FIG. 2 is a perspective view of a suspended load mounting assembly associated with the machine of FIG. 1, according to one embodiment of the present disclosure.

Referring to FIG. 2, the suspended load mounting assembly 124 includes a pair of socket assembly 128 for holding one end of the respective rope 126. Further, the suspended load mounting assembly 124 includes a coupling member 130. It may be noted that the coupling member 130 couples the bucket 122 with each of the socket assembly 128. The socket assembly 128 will now be explained in detail with reference to FIGS. 3 to 7. However, it should be noted that the details of the socket assembly 128 provided below is applicable to each socket assembly associated with the machine 100, without any limitations.

Figure 3:
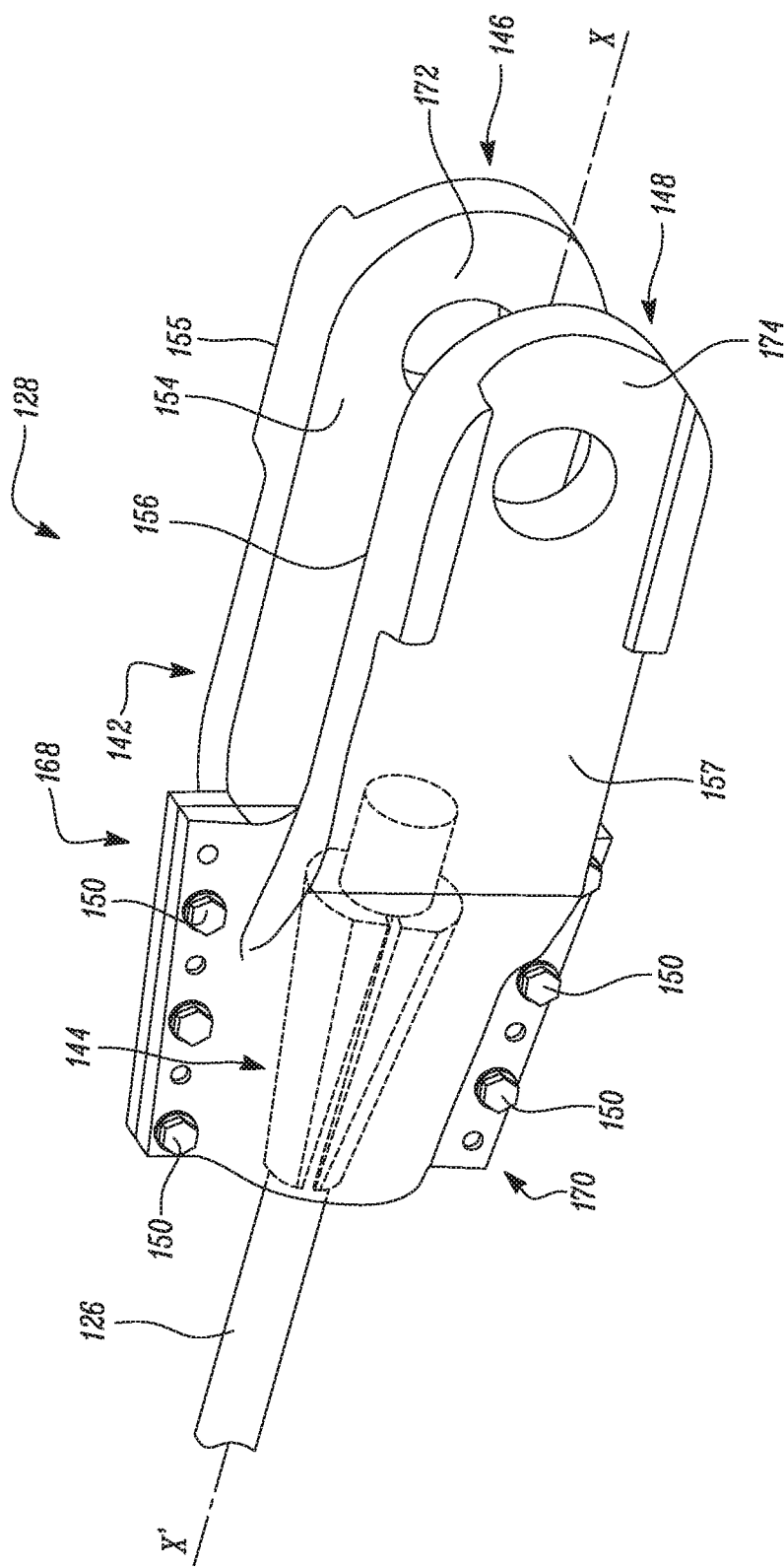
FIG. 3 is a perspective view of a socket assembly associated with the suspended load mounting assembly of FIG. 2, according to one embodiment of the present disclosure.

Referring to FIG. 3, a perspective view of the socket assembly 128 is illustrated. The socket assembly 128 includes a socket 142 and a locking member 144. The socket assembly 128 is used to secure the rope 126 within the socket 142 and the locking member 144. The socket 142 may be made of alloy cast steel and the locking member 144 may be made of mild steel, without any limitations.

The socket 142 includes a fork-shaped design. The socket 142 includes a first frame 146 and a second frame 148 disposed opposite to the first frame 146. It should be noted that the first frame 146 and the second frame 148 are identical to each other with respect to an axis X-X'. The first frame 146 is coupled with the second frame 148 using a number of fastening members 150. The first and second frames 146, 148 may be coupled or removed to release the rope 126 from the locking member 144 based on fastening and removal of the fastening members 150. In one embodiment, the fastening member 150 is a bolt. It may be noted that the fastening member 150 may include a pin, a rivet, a screw, and/or the like. The fastening member 150 may also include a lock washer (not shown) associated therewith.

Figure 5:
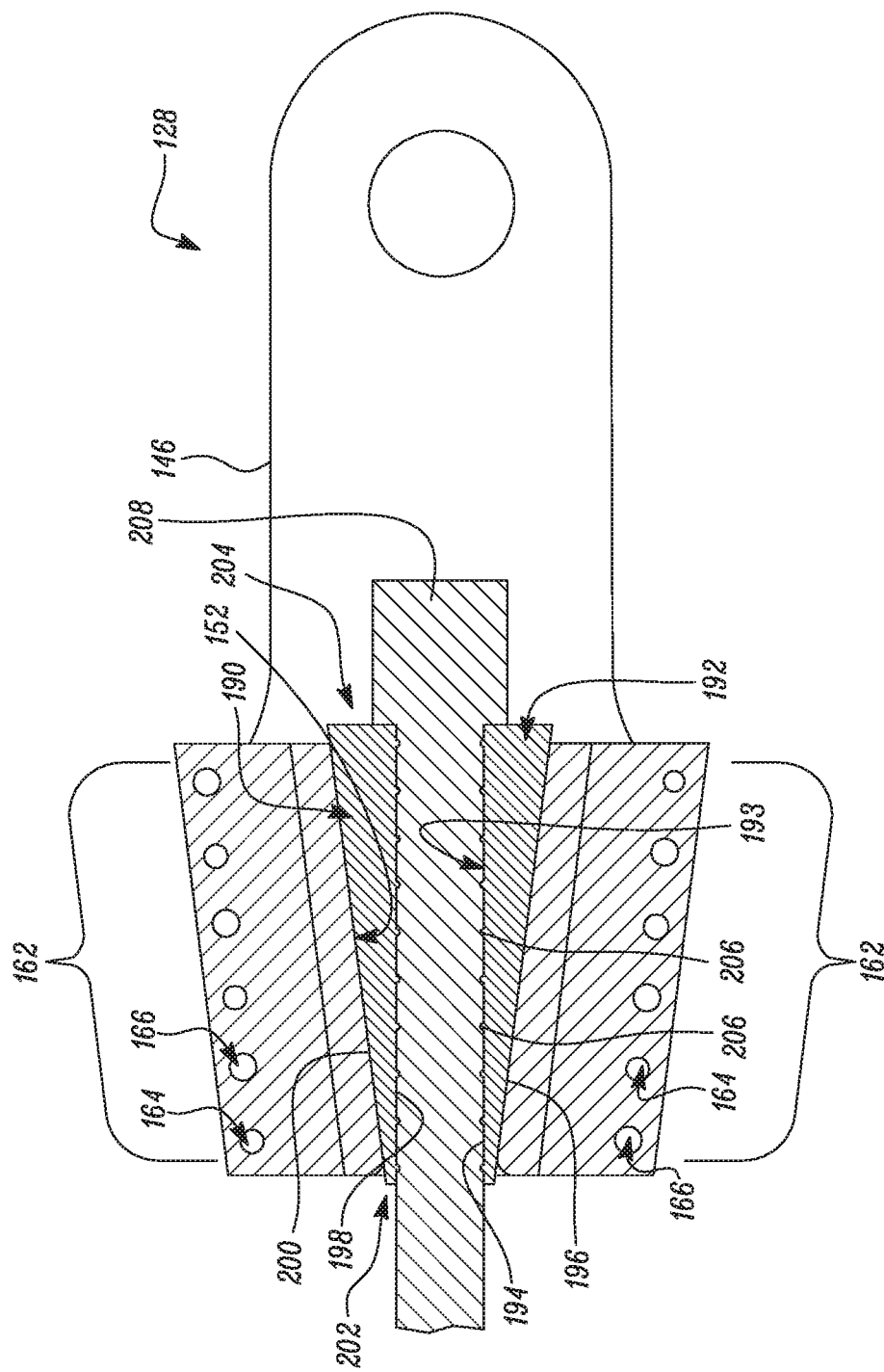
FIG. 5 is a cross sectional view of the socket assembly having the socket and a locking member.

Further, when the first frame 146 is coupled to the second frame 148, the socket 142 defines a first interior space 152 (shown in FIG. 5). The first interior space 152 receives the locking member 144 therein. The first interior space 152 includes a frusto-conical shape. The first frame 146 includes an inner surface 154 and an outer surface 155. The second frame 148 of the socket 142 also includes an inner surface 156 and an outer surface 157. The first and second frames 146, 148 also include a first connecting portion 172 and a second connecting portion 174, respectively. The first and the second connecting portions 172, 174 are adapted to couple to the coupling member 130 (see FIG. 2).

Figure 4:
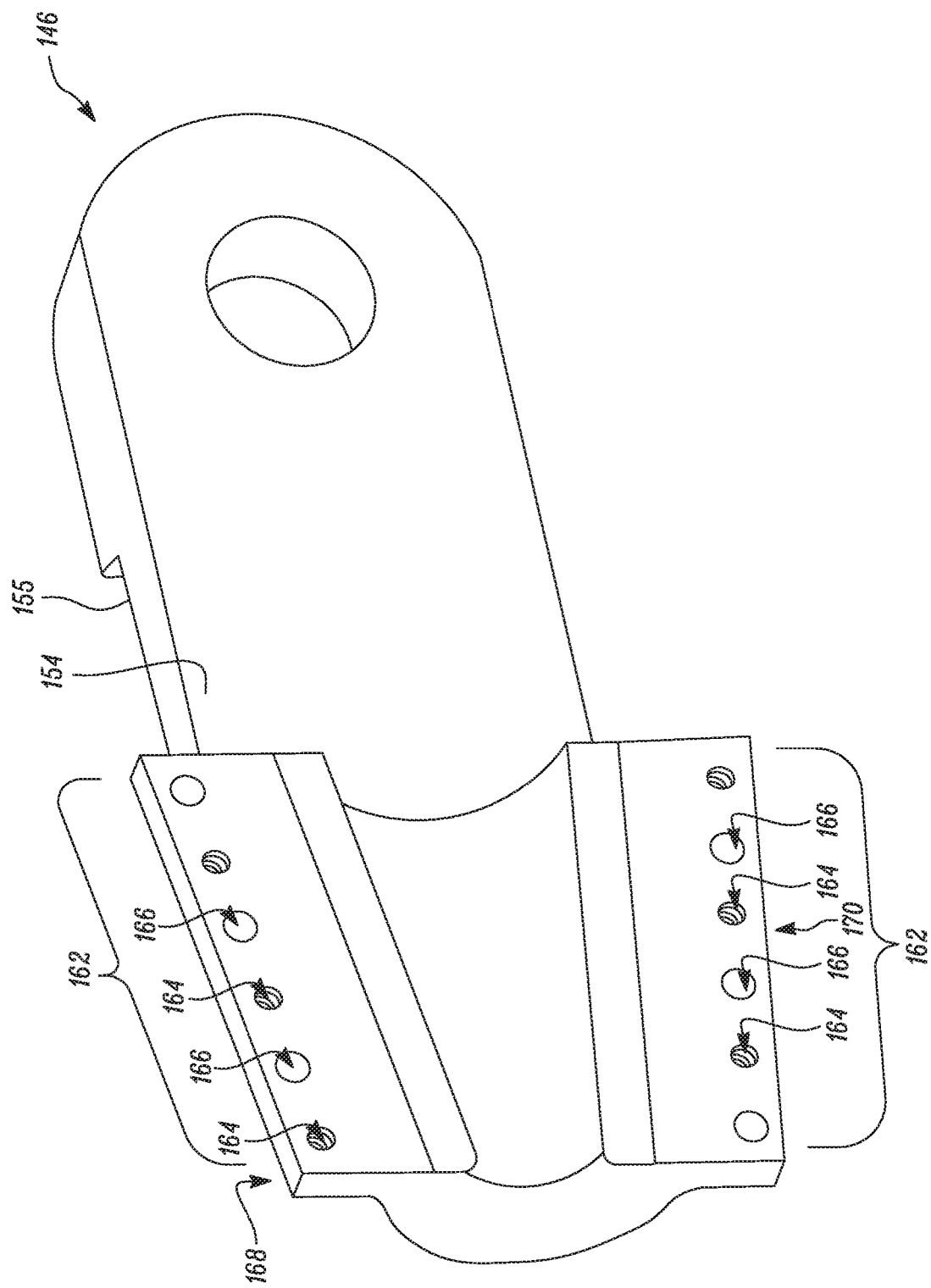
FIG. 4 is a perspective view of a first frame of a socket of the socket assembly of FIG. 3.

The first frame 146 includes a number of apertures 162 (shown in FIG. 4). In the illustrated example, the first frame 146 includes six apertures 162 defined at a top end 168 and six apertures 162 defined at a bottom end 170. The second frame 148 also includes a number of apertures (not shown). More particularly, the second frame 148 includes six apertures defined at a top end 168 and six apertures defined at a bottom end 170. The apertures 162 in the first frame 146 are aligned with the apertures in the second frame 148 to receive the fastening members 150 for coupling the first frame 146 with the second frame 148. It should be noted that the number of apertures 162 in the first frame 146 and the number of apertures in the second frame 148, may vary without any limitations.

The apertures 162 in the first frame 146 include three threaded apertures 164 (shown in FIG. 4) and three clearance holes 166 (shown in FIG. 4) that are positioned alternatively in the first frame 146. It should be noted that the clearance holes 166 do not include threads. Further, the apertures in the second frame 148 also include three threaded apertures and three clearance holes that are positioned alternatively in the second frame 148. It should be noted that the clearance holes in the second frame 148 do not include threads. A number of the threaded apertures 164 and the clearance holes 166 in the first frame 146 are equal to a number of the threaded apertures and the clearance holes in the second frame 148. It should be noted that the threaded apertures 164 in the first frame 146 are aligned with the clearance holes in the second frame 148 for receiving the fastening members 150. Further, the threaded apertures in the second frame 148 are aligned with the clearance holes 166 in the first frame 146 for receiving the fastening members 150.

Figure 6:
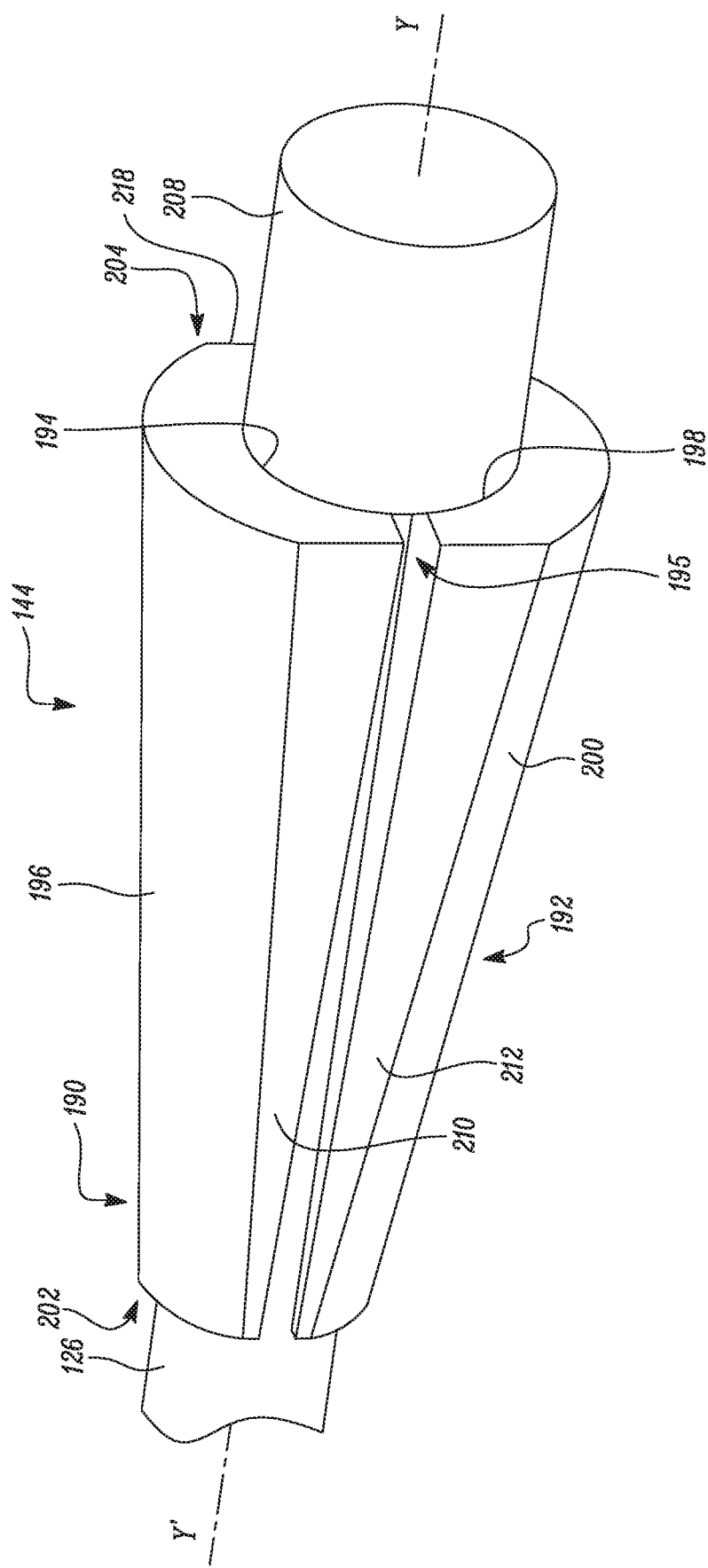
FIG. 6 is a perspective view illustrating the locking member holding a rope.

Referring now to FIGS. 5 and 6, the locking member 144 has a first end 202 and a second end 204. A distance between the first end 202 and the second end 204 defines a length of the locking member 144. The rope 126 enters in the socket assembly 128 via the first end 202 of the locking member 144. The locking member 144 is embodied as a wedge. In other words, the locking member 144 includes a frusto-conical shape. It should be noted that an outer shape of the locking member 144 confirms with the shape of the first interior space 152. The locking member 144 includes a first portion 190 and a second portion 192. The first and second portions 190, 192 define a second interior space 193 (shown in FIG. 5) for holding the rope 126. The second interior space 193 is a cylindrical hollow profile that is defined between the first and second portions 190, 192. It should be noted that dimensions of the first interior space 152, the locking member 144, and the second interior space 193 is decided such that the rope 126 is squeezed and locked up within the second interior space 193 and does not slip out during machine operation. Further, a clearance 195 (shown in FIGS. 6 and 7) is maintained between the first and the second portions 190, 192. In one example, a size of the clearance 195 may be varied according to a size of the rope 126.

Referring to FIG. 6, the first and second portions 190, 192 are identical to each other with respect to an axis Y-Y'. The first and second portions 190, 192 include an inner surface 194, 198 and an outer surface 196, 200. Further, each of the first portion 190 and the second portion 192 of the locking member 144 includes a number of teeth 206 (shown in FIG. 5) protruding from the inner surfaces 194, 198 of each of the first and second portions 190, 192. The teeth 206 assist to grip the rope 126 between the first and second portions 190, 192, when the rope 126 is disposed in the locking member 144. In one example, the teeth 206 may be arranged equidistant from each other, along an entire length of the locking member 144.

Referring now to FIGS. 5 and 6, the socket assembly 128 may also include an axial retainer 208. The axial retainer 208 is positioned at the second end 204 of the locking member 144. The axial retainer 208 is used to retain the rope 126 within the second interior space 193 of the locking member 144. In one example, the axial retainer 208 is a can. In another example, the axial retainer 208 may be embodied as a part of the rope 126 provided in a knotted fashion at the second end 204.

As illustrated in FIG. 6, the first portion 190 includes a first flat surface 210 and a second flat surface 218 defined on the outer surface 196 of the first portion 190. Similarly, the second portion 192 includes a first flat surface 212 and a second flat surface 220 (shown in FIG. 7) defined on the outer surface 200 of the second portion 192. The first flat surfaces 210, 212 and the second flat surfaces 218, 220 extend along the entire length of each of the first and second portions 190, 192.

Figure 7:
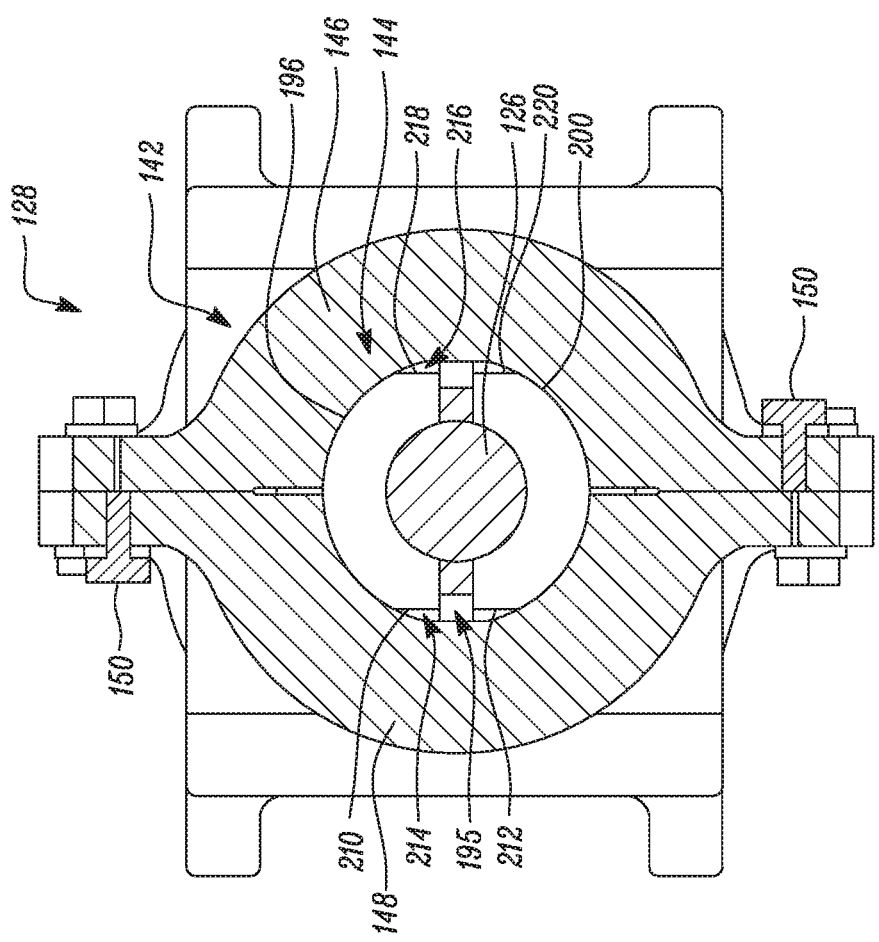
FIG. 7 is a cross sectional view of the socket assembly.

Referring now to FIG. 7, a cross sectional view of the socket assembly 128 is shown. The first flat surfaces 210, 212 and the second flat surfaces 218, 220 define a first clearance 214 and a second clearance 216 between the outer surfaces 196, 200 of the first and second portions 190, 192 of the locking member 144 and the first and second frames 146, 148 of the socket 142. It should be noted that a size of the first and second clearances 214, 216 may be varied, based on system requirements.

INDUSTRIAL APPLICABILITY

The present disclosure relates to the socket assembly 128 associated with the suspended load mounting assembly 124 and a method 800 of servicing the socket assembly 128. The socket 142 of the socket assembly 128 according to the present disclosure includes a two piece design having the first frame 146 and the second frame 148 coupled using the fastening members 150. Further, the locking member 144 also includes a two piece design.

The socket 142 can be separated easily by removing the fastening members 150, and hence the locking member 144 can be disengaged for removal and/or replacement of the rope 126. Thus, the split design of the socket 142 and the locking member 144 described in the present disclosure eliminates requirement of heavy tools, such as hammers for removing the locking member 144 from the socket 142. Further, the threaded apertures 164 and the clearance holes 166 in the first frame 146, and the threaded apertures and the clearance holes in the second frame 148 for receiving the fastening members 150 are disposed alternatively in the first and the second frame 146, 148 such that the first and second frames 146, 148 may be used interchangeably.

Further, the number of teeth 206 present on the first and second portions 190, 192 of the locking member 144 provide increased grip for holding the rope 126 in place. The socket assembly 128 also includes the axial retainer 208 that assists in further retention of the rope 126 within the second interior space 193 of the locking member 144.

Figure 8:
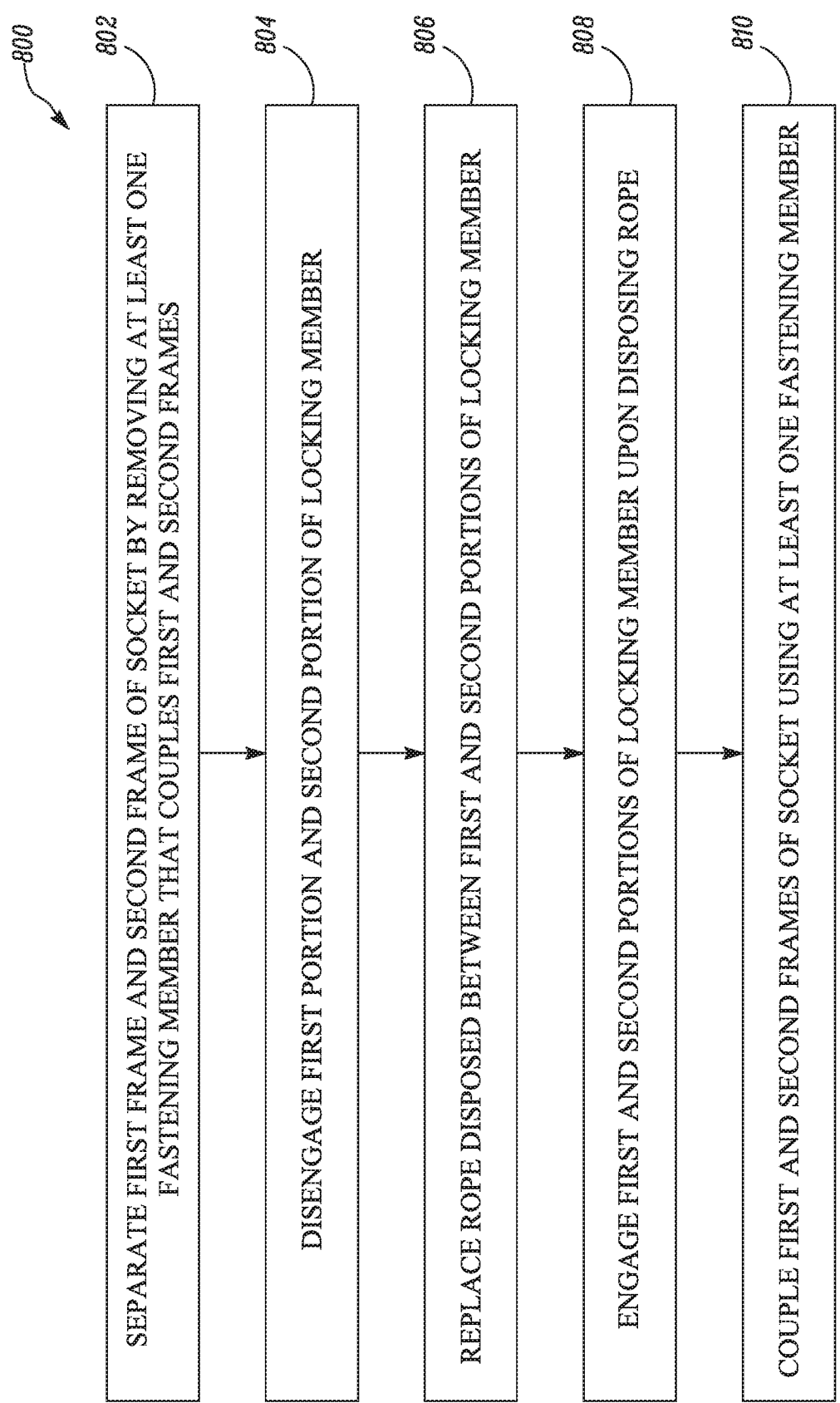
FIG. 8 is a flowchart illustrating a method of servicing the socket assembly, according to one embodiment of present disclosure.

FIG. 8 is a flowchart for the method 800 of servicing the socket assembly 128 having the socket 142 and the locking member 144. The socket 142 includes the first frame 146 and the second frame 148 that are coupled to each other for securing the locking member 144 and the rope 126 therein. At step 802, the first and second frames 146, 148 of the socket 142 are separated. The first and second frames 146, 148 are separated by removing the fastening members 150 that couples the first and second frames 146, 148.

At step 804, the first and second portions 190, 192 of the locking member 144 are disengaged based on the separation of the first and second frames 146, 148. Further, at step 806, the rope 126 disposed between the first and the second portion 190, 192 of the locking member 144 is replaced. It should be noted that the rope 126 is received within the second interior space 193 of the locking member 144. At step 808, the first and second portions 190, 192 of the locking member 144 are engaged upon replacing the rope 126. Further, at step 810, the first frame 146 and the second frame 148 of the socket 142 are coupled using the fastening members 150 such that the locking member 144 and the rope 126 are secured within the socket 142.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A socket assembly comprising:
   a socket defining a first interior space, wherein the socket includes a first frame and a second frame disposed opposite to the first frame, the first frame being removably coupled with the second frame using at least one fastening member;
   a locking member disposed within the first interior space of the socket, the locking member including a first body portion and a second body portion, the first body portion and the second body portion each including a first end and a second end opposite the first end, and a first flat side surface and a second flat side surface between the locking member and the socket when the locking member is disposed in the socket;
   wherein the first and second body portions define a second interior space and are configured to directly contact a rope to hold the rope; and
   wherein the first body portion of the locking member is not secured to the second body portion of the locking member when the locking member is disposed within the first interior space of the socket.

2. The socket assembly of claim 1, wherein the locking member includes a frusto-conical shape.

3. The socket assembly of claim 1, wherein the first interior space conforms to an outer profile of the locking member for receiving the locking member within the socket.

4. The socket assembly of claim 1, wherein the second interior space includes a cylindrical hollow profile.

5. The socket assembly of claim 1, wherein the first flat side surface and the second flat side surface extend between the first and second ends to maintain a first clearance and a second clearance along the entire length, respectively, between the locking member and the socket when the locking member is disposed in the socket.

6. The socket assembly of claim 1, wherein each of the first and second body portions of the locking member includes a plurality of teeth protruding from an inner surface of each of the first and second body portions.

7. The socket assembly of claim 1, wherein each of the first and second body portions includes a first end and a second end opposite the first end, and wherein the first ends of the first and second body portions extend from a front end of the socket.

8. The socket assembly of claim 1, wherein each of the first and second frames includes at least one threaded aperture to receive the at least one fastening member.

9. The socket assembly of claim 1, wherein the locking member is secured within the first interior space by fastening the first and second frames of the socket using the at least one fastening member.

10. The socket assembly of claim 1, wherein no part of the first body portion of the locking member touches any part of the second body portion of the locking member.

* * * * *